July 3, 1951  N. J. PETERS ET AL  2,559,046
VALVE
Filed Sept. 19, 1947

INVENTORS
Norman J. Peters
Karl W. Fleutje
BY
Quarles & French
ATTORNEYS

Patented July 3, 1951

2,559,046

UNITED STATES PATENT OFFICE 2,559,046

VALVE

Norman J. Peters and Karl W. Flentje, Fond du Lac, Wis., assignors to Damrow Brothers Company, Fond du Lac, Wis., a corporation of Wisconsin Application September 19, 1947, Serial No. 774,904

1 Claim. (Cl. 251—125)

The invention relates to float controlled valves.

The object of the invention is to provide a float controlled valve of simple construction which may be easily repaired, will not vibrate when in partially open position, and is substantially non-clogging and will have a long life.

The invention further consists in the several features hereinafter set forth and more particularly defined by claim at the conclusion hereof.

Figure 1:
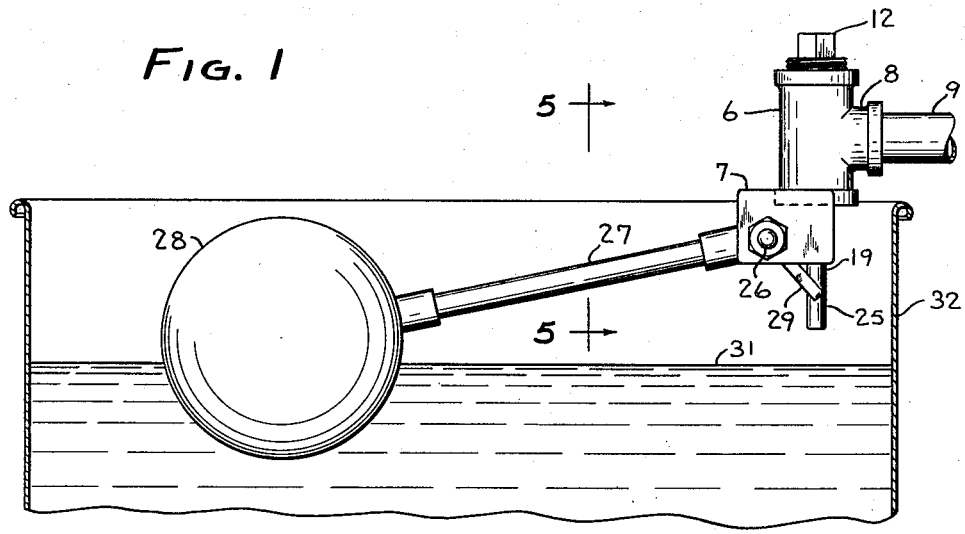
Fig. 1 is a side-elevational view of the valve embodying the invention installed in a tank shown in section.

Referring to the drawings, the valve includes a metal casing or housing 6 in the form of T-pipe fitting provided with integrally formed diametrically disposed ears or arms 7 at one end. The offset branch 8 of the T is threaded to receive a fluid supply pipe 9. The alined ends of the T are threaded at 10 and one of these ends is provided with a bore forming a shoulder 11.

The upper threaded end 10 of the T has a pipe plug 12 mounted therein recessed at 13 to form a seat for a closing spring 14.

The lower threaded end 10 of the T is adapted to receive a removable threaded seat member 15 in the form of a sleeve provided with a flanged end 16 to abut the shoulder, said seat member being provided with any suitable means for receiving a wrench for screwing it into place, as for example holes 17, to receive the pin ends of a spanner wrench. The member 15 has a flat valve seat 18. The valve seat may also be formed as an integral part of the housing 6, but to facilitate repair a removable seat is preferred.

The valve member is formed by a round metal rod 19 having its inner end threaded to receive nuts 20 and 21 between which a metal washer 22 and a valve head 23 are clamped. The valve head 23 is preferably of composition material such as hard rubber and has a flat face 24 adapted to be normally held by the spring 14 in seating engagement with the seat. The rod 19 extends down through the sleeve 15 and projects below the lower end of the T-fitting and forms a stem 25.

Pivotally mounted on a pivot pin or bolt 26 carried by the ears or arms 7 is a rod or float lever 27 carrying a ball float 28 at its outer end. Also preferably formed integral with the pivot end of the rod 26 is a trip lever 29 whose outer end has a curved wedge surfaced notch 30 adapted to contact the stem 25 of the valve.

Figure 2:
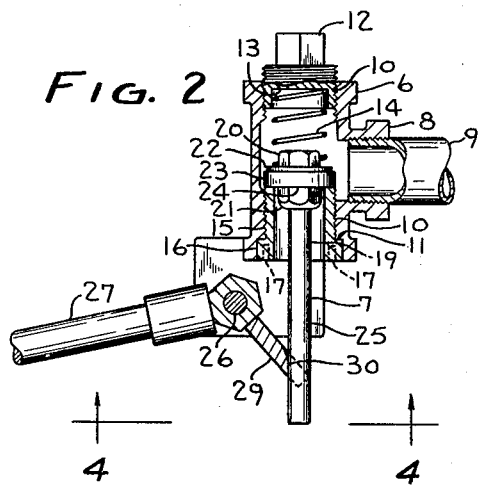
Fig. 2 is a vertical sectional view of the valve with the valve in its closed position, the section being taken along the line 2—2 of Fig. 5.
Figure 3:
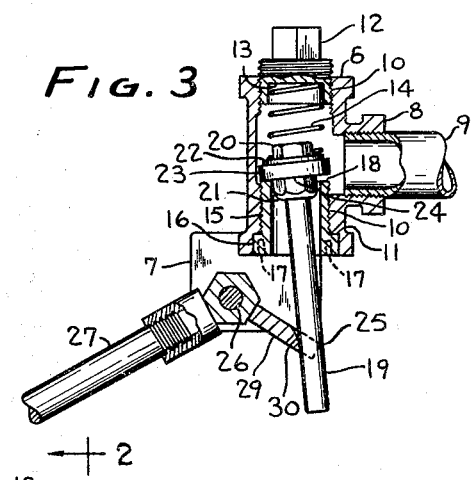
Fig. 3 is a view similar to Fig. 2 showing the valve in its opened position.
Figure 4:
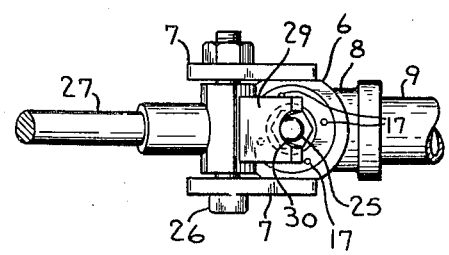
Fig. 4 is a bottom plan view of the valve as viewed along the line 4—4 of Fig. 2.
Figure 5:
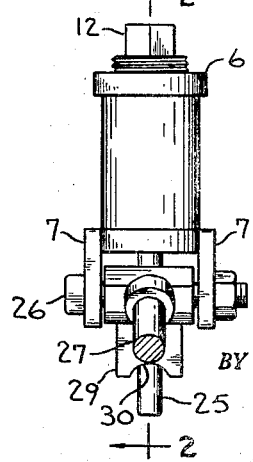
Fig. 5 is a detailed vertical sectional view taken on the line 5—5 of Fig. 1.

When the water or liquid level 31 of the liquid in the tank 32 is at its highest point as shown in Fig. 1, the float lever 27 is in a position in which the trip lever 29 exerts no pressure on the stem 25 and the valve is closed as shown in Fig. 2. When, due to a release of liquid from the tank 32, its level drops so that the float lever 27 swings downwardly, the trip lever 29 is swung upwardly and pushes against the stem 25 of the valve and acting in opposition to the spring 14 tilts its head 23 off its seat 18 to open the valve as shown in Fig. 3 to admit liquid into the tank 32. When the liquid again rises in the tank to the position shown in Fig. 1, the float lever moves to a release position, and the spring 14 moves the valve to its closed position shown in Fig. 2.

We desire it to be understood that this invention is not to be limited to any particular form or arrangement of parts except in so far as such limitations are included in the claim.

What we claim as our invention is:

In a valve of the character described, the combination of a housing having an inlet and an outlet provided with a seat, a valve mounted on said seat and having a round stem projecting through said outlet, spaced arms on said housing adjacent said stem, a lever pivotally supported from said arms and having a trip lever connected thereto whose outer end has a curved wedge surfaced notch to engage the stem of the valve and guide and move it laterally to tilt the valve on its seat to an open position, and spring means to close said valve.

NORMAN J. PETERS.
KARL W. FLENTJE.

REFERENCES CITED

The following references are of record in the file of this patent:

UNITED STATES PATENTS

| Number | Name | Date |
|---|---|---|
| 258,433 | Keith | May 23, 1882 |
| 1,013,806 | Ogg | Jan. 2, 1912 |
| 1,850,354 | Owens | Mar. 22, 1932 |
| 2,015,765 | Strutzel | Oct. 1, 1935 |